July 27, 1965   C. VAN DER LELY ETAL   3,197,214
DEVICE FOR SPREADING GRANULAR OR POWDERY MATERIAL
Original Filed Jan. 26, 1959
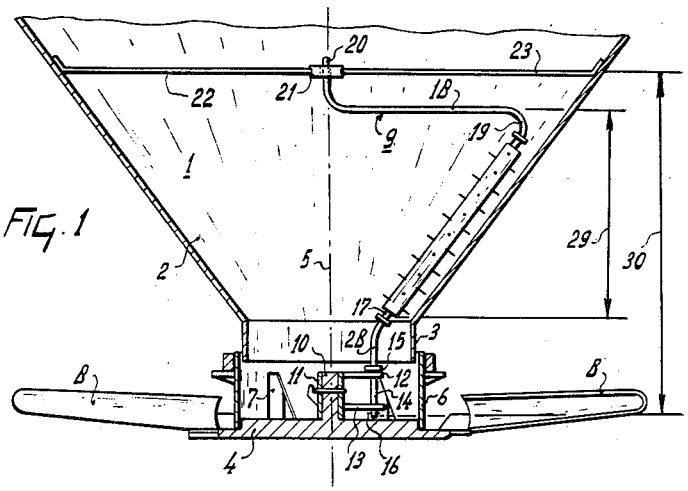
FIG. 1
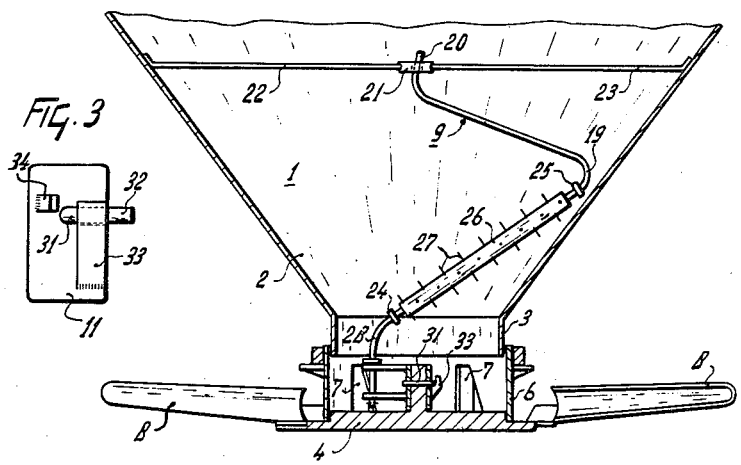
FIG. 2
FIG. 3
INVENTORS
CORNELIS & ARY VAN DER LELY
BY
Mason, Mason & Albright
Attorneys

3,197,214

DEVICE FOR SPREADING GRANULAR OR POWDERY MATERIAL

Cornelis van der Lely, Zug, Switzerland, and Ary van der Lely, Maasland, Netherlands, assignors to C. van der Lely N.V., Maasland, Netherlands, a Dutch limited-liability company
Original application Jan. 26, 1959, Ser. No. 788,884, now Patent No. 3,038,643, dated June 12, 1962. Divided and this application May 31, 1962, Ser. No. 199,019
10 Claims. (Cl. 275—15)

This application, which is a divisional application of application Serial No. 788,884 now Patent No. 3,038,643, relates to a device for spreading granular or powdery material, comprising a material container from which the material to be spread is delivered, an agitating member mounted in said container so as to be movable relative to the container wall, said agitating member being driven during operation by a mechanism movable about an axis extending vertically or substantially vertically in the container.

In accordance with the invention the agitating member has at least one arm, the lower end of which is coupled to the mechanism at a distance from the said axis, the arm extending from the said coupling to the mechanism upwardly in a direction to the container wall and the upper portion of the arm being bowed away from the container wall and extending in the direction of the axis and being borne near said axis at a point higher than the coupling of the lower end of the arm to the mechanism.

With the construction according to the invention a simple agitating member can be obtained, with which the material can be delivered in an effective way from the container.

For a better understanding of the invention and to show how the same may be carried into effect, reference will now be made to the accompanying drawings, in which:

FIG. 1 is a sectional view of a container of a device according to the invention, comprising an agitating member, FIG. 2 is a sectional view of the container as shown in FIG. 1, the agitating member occupying a different position, FIG. 3 shows, on an enlarged scale, a view of the connecting means with which the agitating member is coupled to the stub shaft of the disc below the container.

As shown in the figures, the device of the embodiment according to the invention comprises a container 1, which consists of a conical portion 2 and a cylindrical portion 3. Underneath the container 1 provision is made of a mechanism 4 which is formed by a disc and is capable of rotating about an axis of rotation 5, which extends vertically in the container. Between the container 1 and the mechanism 4 an annulus 6 is arranged, the upper end of which surrounds the cylindrical portion 3, whereas the lower end bears on the disc 4 constituting partly the bottom of the container. The annulus 6 is provided with outlet ports 7. The material delivered through the outlet ports 7 is supplied by way of the disc 4 which extends over a small distance beyond the annulus 6 to spreading arms 8 which are provided on the disc 4.

In order to ensure a satisfactory supply of material out of the container to the outlet ports 7, an agitating member 9 is arranged inside the container to prevent caking of the material in the container. The agitating member consists of one arm having several portions and bowed from one piece of material. In order to cause the member 9 to move relative to the container, it is coupled with its lower end with the mechanism 4. The connection of the agitating member 9 to the mechanism or disc 4 is realized at a distance from the axis 5. The connection of the agitating member 9 with the mechanism 4 is obtained by means of a stub shaft 10 connected to the disc 4 and surrounded by a sleeve 11. The sleeve 11 is connected to the shaft 10 by means of a pin 31 mounted in holes in the sleeve 11 and the shaft 10, which holes are in alignment. This pin 31 has a curved portion 32 which can grasp behind a lug 33 mounted to the sleeve 11. The sleeve 11 is provided with two tags 12 and 13 having holes through which a shaft 14 constituting the lower end of the member 9 is taken. The shaft 14 is secured against displacement in the holes of the tags 12 and 13 by means of a ring 15, arranged on the shaft 14, and by means of a pin 16. The shaft 14 is arranged in the holes of the tags 12 and 13 so that it is capable of turning in these holes. These holes constitute a first bearing for the agitating member, whereby it can turn through an angle of 360° about an axis which is constituted by the centre line of the shaft 14 arranged parallel to the axis 5.

The agitating member 9 which may be made of one piece of resilient material comprises a portion 17 extending from the shaft 14 in an obliquely upward direction in the container and connected to the shaft 14 by means of a bend 28 constituting a coupling member by means of which the agitating member is resiliently pivotable about a horizontal axis relative to the stub shaft 10.

The portion 17 extends from the shaft 14 to the container wall and is bent over a bend 19 away from the container wall to constitute a straight upper portion 18 extending from the container wall in the direction of the axis 5. The end 20 of the portion 18 is bent upwardly and borne in a member constituted by a bearing 21 which is centrally arranged in the container portion 2. The bearing 21 is located at a higher point in the container than the coupling of the lower end 14 of the agitating member 9 with the disc 4 and is mounted in the container 1 by means of rods 22 and 23. The shaft 14 is integral with the portions 17 and 18 whereby the agitating member consists of only one arm. The shaft 14 which is at right angles to the disc 4 goes over via the coupling member 28 into the portion 17 which is at an obtuse angle to the shaft 14. The centre line of the bearing 21 around which the upper end 20 of the member 9 is movable coincides with the axis of rotation 5 constituted by the centre line of the stub shaft 10, whereas the straight portion 18 intersects the axis 5 at an angle of 90° or about 90° and the portion 17 extends, in the central position of the agitating member (see FIG. 1), mainly along the walls of the conical-shaped portion 2 of the container 1. The portion 17 is provided with two stops or rings 24 and 25 between which is arranged an element shaped as a bushing 26 which is capable of turning about the portion 17. In the central position of the member 9 the bushing extends in an upwards direction at a height 29 which is nearly as long as the length of the portion 17, and which is somewhat longer than half the height 30 of the agitating member 9. The length of the bushing 26 is slightly smaller than the distance between the rings 24 and 25, so that this bushing is movable between the rings in a direction parallel to the portion 17. The bushing 26 is provided with pins or extensions 27 which are at right angles to the longitudinal direction of the portion 17 and will agitate the material in the container to satisfactory looseness, upon a movement of the member 9.

During the operation of the device the mechanism or driving means 4 will rotate about the axis 5, whilst the tags 12 and 13 and the shaft 14 will follow the said movement about the axis 5, since the sleeve 11 is rigidly secured to the stub shaft 10. If the container is filled with the material to be spread, the member 9 is not capable of following the rotation of the shaft 14 in the container, since the resistance exerted by the material on the said member will be too heavy. If the portions 17 and 18 of the member 9 cannot follow the shaft 14 during its rotation about the axis 5, these portions will be deformed, since the position of the shaft 14 changes. These deformations will occur between the state of equilibrium of the member 9, shown in FIGURE 1, and the state in which the shaft 14 is most remote from the state of equilibrium, as is shown in FIGURE 2. During the movement of the shaft 14 about the axis 5, the portions 17 and 18 will perform a swinging motion in a subtantially vertical direction. Owing to this swinging motion, during which particularly the pins 27 provided on the bushing 26 are capable of performing a scratching movement in the material, the material will be continuously supplied to the ports 7. When the mechanism 4 rotates, the member 9 will always tend to maintain its state of equilibrium, so that it will tend to rotate with the mechanism 4 about the axis 5. Thus, if the material tends to cake in the container and if the member 9 has made a cavity in the material, the member 9 will continuously be urged against the wall of this cavity, so that it digs continuously further through the material and rotates slowly around the axis 5 moving along the container wall, a constant supply to the ports 7 being thus ensured. The mentioned movement of the agitating member in the container has the advantage that this movement requires only little energy.

The member 9 can be rapidly removed out of the container by removing the pin 31. The pin 31 can be readily removed by turning the same in the holes in the sleeve 11 and the shaft 10 and by unhooking the portion 32 from the lug 33 and by withdrawing the pin 31 from the sleeve 11 and the shaft 10, after which the sleeve 11 with the member 9 can be taken out of the container. A stop 34 is provided on the sleeve 11 to prevent a turning of the portion 32 to the wrong side instead of behind the lug 33 when mounting the agitator to the shaft 10.

What we claim is:

1. A device for spreading material comprising a material holding hopper, an ejector disc arranged below said hopper, said hopper having at least one outlet port for delivering material, a shaft extending upwardly in the lower part of said hopper, an arm extending obliquely and upwardly in said hopper, the lower end of said arm being connected to said shaft, and said arm being movable about a horizontal axis relative to said shaft, eccentric driving means being provided to move said arm in a circular direction entirely around the inner wall of said hopper and said arm extending substantially along the wall of said hopper.

2. A device as claimed in claim 1, wherein the upper end of said arm is provided with a portion extending inwardly to the center of said hopper and being rotatably mounted in a bearing coinciding with the center line of said hopper.

3. A device as claimed in claim 1, wherein the center part of said ejector disc constitutes the bottom of said hopper, said shaft is connected to and extends upwardly from the center of said disc, said driving means includes a side member secured to said shaft, the lower end of said arm being connected to said member and eccentrically and rotatably mounted with respect to said shaft.

4. A device as claimed in claim 1, wherein an element is rotatably mounted on said arm, said element having projecting extensions.

5. A device as claimed in claim 4, wherein stops are fixed to the arm near both ends of said element.

6. A device for spreading granular or powdery material comprising a material holding hopper, an ejector disc arranged below said hopper, said hopper having at least one outlet port for delivering material, a shaft extending upwardly from said disc in the lower part of said hopper, a side member secured to said shaft, an arm bowed from one piece of resilient material in said hopper, the lower end of said arm being borne eccentrically to the axis of rotation of said disc on said side member whereby said arm is rotatable around an axis parallel to the axis of rotation of said disc, a portion of said arm extending from the said lower end obliquely and upwardly to the hopper wall, an upper end of said arm extending from adjacent said wall inwardly to the center of the hopper and being rotatably mounted in a bearing in the center of the hopper, said bearing having a substantially vertical axis.

7. A device for spreading material, comprising a hopper for the material to be spread, an agitating member extending upwardly in said hopper, the upper portion of said member being journalled in means supported on said hopper, driving means movable about an axis extending substantially vertically in the hopper, eccentric coupling means to couple the said agitating member to said driving means so as to move the agitating member during operation entirely around the hopper wall, said coupling means including a quick releasing pin for disconnecting the agitating member.

8. A device as claimed in claim 7, wherein the coupling means comprises a shaft and a sleeve, said shaft being carried in said sleeve, said pin being carried in a hole in said shaft.

9. A device as claimed in claim 8, wherein said sleeve includes a lug and said pin includes a bowed end, a hole being provided near said lug in the sleeve in alignment with the hole in said shaft, said pin being rotatable in the holes and said bowed end lying behind said lug.

10. A device for spreading material comprising a hopper, an ejector disc arranged below said hopper, said hopper having at least one outlet port for delivering material, a shaft extending upwardly in the lower part of said hopper, an arm extending upwardly in said hopper, a bushing rotatable around said arm, said bushing being provided with parts extending laterally in the hopper, said arm being movable about a horizontal axis relative to said shaft, coupling means to couple the lower end of said arm eccentrically to said shaft to move the agitating member during operation relative to the hopper wall, said coupling means including a quick releasing pin for disconnecting the agitating member.

References Cited by the Examiner

UNITED STATES PATENTS

| 1,190,168 | 7/16 | Holly | 222—227 X |
|---|---|---|---|
| 1,948,021 | 2/34 | Burton | 222—404 X |
| 2,368,127 | 1/45 | Fasick | 222—232 |
| 2,369,508 | 2/45 | White | 222—228 X |
| 2,535,414 | 12/50 | Heidger | 275—15 X |
| 2,576,620 | 11/51 | Martin | 222—228 |
| 2,644,618 | 7/53 | Oehler | 222—228 X |
| 2,685,388 | 8/54 | Steiner | 222—234 X |
| 2,795,405 | 6/57 | Christopher | 259—134 X |
| 2,975,937 | 3/61 | Totten | 222—228 X |
| 3,038,643 | 6/63 | Van Der Lely et al. | 222—227 |

FOREIGN PATENTS

| 828,384 | 2/60 | Great Britain. |
|---|---|---|
| 174,632 | 3/61 | Sweden. |

RAPHAEL M. LUPO, *Primary Examiner.*

LOUIS J. DEMBO, *Examiner.*